US012680941B2

(12) United States Patent
Liao

(10) Patent No.: US 12,680,941 B2
(45) Date of Patent: Jul. 14, 2026

(54) HOLLOW CORE WAVEGUIDE FLOW CELL

(71) Applicant: Thermo Scientific Portable Analytical Instruments Inc., Tewksbury, MA (US)

(72) Inventor: Chien-Sheng Liao, Sunnyvale, CA (US)

(73) Assignee: Thermo Scientific Portable Analytical Instruments Inc., Tewksbury, MA (US)

( * ) Notice: Subject to any disclaimer, the term of this patent is extended or adjusted under 35 U.S.C. 154(b) by 210 days.

(21) Appl. No.: 18/515,557

(22) Filed: Nov. 21, 2023

(65) Prior Publication Data

US 2024/0167935 A1    May 23, 2024

Related U.S. Application Data

(60) Provisional application No. 63/384,505, filed on Nov. 21, 2022.

(51) Int. Cl.
*G01N 15/1434* (2024.01)
*G01N 15/01* (2024.01)
*G01N 15/10* (2024.01)
*G01N 15/1404* (2024.01)

(52) U.S. Cl.
CPC ..... *G01N 15/1436* (2013.01); *G01N 15/1404* (2013.01); *G01N 15/01* (2024.01); *G01N 2015/1006* (2013.01)

(58) Field of Classification Search
CPC .......... G01J 3/0272; G01J 3/0291; G01J 3/44; G01N 15/01; G01N 15/1404; G01N 15/1436; G01N 2015/1006; G01N 2021/052; G01N 2021/3595; G01N 2021/6417; G01N 2021/6467; G01N 2021/6484; G01N 2021/651; G01N 21/05; G01N 21/19; G01N 21/31; G01N 21/645;

(Continued)

(56) References Cited

U.S. PATENT DOCUMENTS

| | | | |
|---|---|---|---|
| 5,444,807 A | 8/1995 | Liu | |
| 6,542,231 B1 * | 4/2003 | Garrett ................... | G02B 6/032 385/12 |
| 2006/0257089 A1 | 11/2006 | Mueth et al. | |

(Continued)

FOREIGN PATENT DOCUMENTS

| | | |
|---|---|---|
| CN | 109342390 A | 2/2019 |
| WO | WO-2012055432 A1 | 5/2012 |

OTHER PUBLICATIONS

PCT/US2023/080648, International Search Report and Written Opinion, Mar. 6, 2024, 14 pages.

*Primary Examiner* — Hina F Ayub

(57) ABSTRACT

A flow cell for use with a spectrometer is described. The flow cell includes a waveguide having a hollow core. An inlet is fluidly coupled at a first end of the hollow core, and an outlet is fluidly coupled at a second end of the hollow core. A window at the inlet is optically coupled to the waveguide at the second end, and a mirror at the outlet is optically coupled to the waveguide at the second end. The flow cell also includes a first conduit configured to couple a fluid to the inlet, and a second conduit configured to couple the fluid to the outlet. Methods and systems using the flow cell are described. For example, methods and systems for monitoring a bioreactor.

22 Claims, 8 Drawing Sheets

(58) Field of Classification Search
CPC ........... G01N 21/65; G01N 2201/0221; G01N
2201/08; G02B 2006/0325
See application file for complete search history.

(56) References Cited

U.S. PATENT DOCUMENTS

| | | | |
|---|---|---|---|
| 2009/0214386 A1 | 8/2009 | Beigel et al. | |
| 2012/0069340 A1 | 3/2012 | Mueller | |
| 2012/0078531 A1* | 3/2012 | Lo ...................... | G01N 15/1434 |
| | | | 702/21 |
| 2016/0320288 A1* | 11/2016 | Fortin ................ | G01N 21/6428 |
| 2021/0018433 A1 | 1/2021 | Liu et al. | |
| 2021/0156869 A1 | 5/2021 | Weinberger et al. | |
| 2022/0091036 A1 | 3/2022 | Katayama et al. | |
| 2022/0205925 A1* | 6/2022 | Belz ........................ | G01N 21/05 |
| 2023/0144123 A1* | 5/2023 | Boersma ............ | G01N 15/1459 |
| | | | 356/437 |
| 2023/0417655 A1* | 12/2023 | Clarke ................ | G01N 21/474 |
| 2025/0216323 A1* | 7/2025 | Nishi .................... | G01N 21/05 |

* cited by examiner

300

HOLLOW CORE WAVEGUIDE FLOW CELL

FIELD OF THE INVENTION

This invention is directed to a hollow core waveguide flow cell. In particular, a hollow core waveguide flow cell for use with a portable optical spectrometer.

BACKGROUND OF THE INVENTION

Analytical monitoring of bioprocesses is crucial at all stages for product manufacturing to achieve quality by design in bio-pharmaceutical industries. In upstream processes, raw materials require identification and purity checks. In seed or production bioreactors, cell viability, nutrients, and metabolites need to be monitored continuously. Optical spectroscopies are attractive in process analytical technologies (PAT) at least in part due to their non-destructive nature and suitability for offline and online analysis. However, sensitivity can be low, requiring long measurement times or long excitation beam path lengths to collect enough sample light.

To increase the signals for optical spectroscopy measurements, extending the pathlength of a flow cell is a common approach. There are currently long-pathlength flow cells commercially available for optical absorption spectroscopy. Flow cells that can reach 500 cm pathlength are known. These flow cells utilize a capillary as the waveguide to confine the light inside the liquid of interest. Progress using a hollow core waveguide flow cell are described in U.S. Pat. Nos. 5,604,587, 8,674,306 and US Pre-grant publication US20100007876A1, each of which are herein incorporated by reference. These flow cells are either designed for laser excitation in one direction or have external reflectors for two-pass excitation.

There is therefore a need for further improvements of flow cells for use with optical spectroscopy. For example, there is a need for improved flow cells that can be used with portable optical spectroscopy instruments.

SUMMARY

Systems, methods, and products to address these and other needs are described herein with respect to illustrative, non-limiting, implementations. Various alternatives, modifications and equivalents are possible.

According to a first aspect, a flow cell is described. The flow cell includes a waveguide having a hollow core. An inlet is fluidly coupled at a first end of the hollow core, and an outlet is fluidly coupled at a second end of the hollow core. A window at the inlet is optically coupled to the waveguide at the first end, and a mirror at the outlet is optically coupled to the waveguide at the second end. The flow cell also includes a first conduit configured to couple a fluid to the inlet, and a second conduit configured to couple the fluid to the outlet.

According to a second aspect, a system for in-line monitoring of a fluid process is described. The system includes a waveguide having a hollow core defined between a first end and a second end of the waveguide. A window is optically coupled at the first end and configured to transmit light into and out of the hollow core. A mirror is optically coupled at the second end of the waveguide and configured to reflect light towards the first end. An inlet is fluidly coupled at the first end to the hollow core and an outlet is fluidly coupled at the second end to the hollow core. A first conduit fluidly couples a reactor to the inlet, and a second conduit fluidly couples the outlet to the reactor. The system also includes an Optical spectrometer optically coupled to the waveguide.

According to a third aspect, a method of analyzing a liquid sample is described. The method includes: connecting an optical spectrometer to the flow cell according to the first aspect: flowing the fluid through the flow cell: injecting an excitation light into the flow cell through the window: extracting a sample light from the flow cell through the window: and providing the sample light to the spectrometer for analysis of the fluid sample.

The flow cell provides a compact device that, when coupled to a optical spectrometer, provides a convenient way to analyze liquid samples in-line with a liquid process. The flow cell waveguide, with a mirror fixed at one end, provides a long path length for interaction of an excitation light beam with a fluid sample, providing high sensitivity.

BRIEF DESCRIPTION OF THE DRAWINGS

The foregoing and other features and advantages of the present embodiments will be more fully understood from the following detailed description of illustrative embodiments taken in conjunction with the accompanying drawings.

FIG. 6B is a raw spectra of glucose solution and DI water collected using a cuvette rather than a flow cell.

Figure 1A:
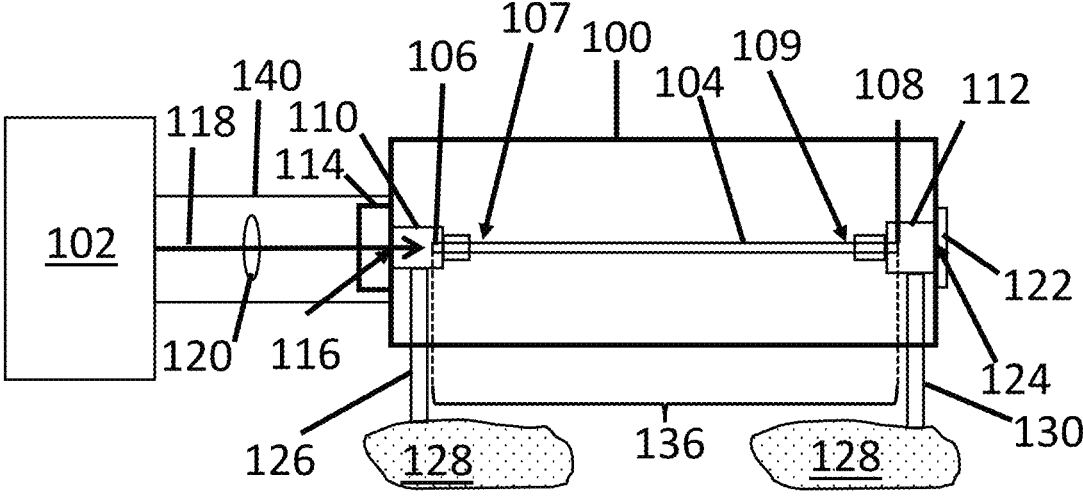
FIG. 1A is a diagram of a flow cell and an Optical spectrometer, according to some implementations.

The figures referred to above are not drawn necessarily to scale, should be understood to provide a representation of particular embodiments, and are merely conceptual in nature and illustrative of the principals involved. The same reference numbers are used in the drawings for similar or identical components and features shown in various alternative embodiments.

DETAILED DESCRIPTION

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the statistical dispersion found in their respective testing measurements.

Figure 1B:
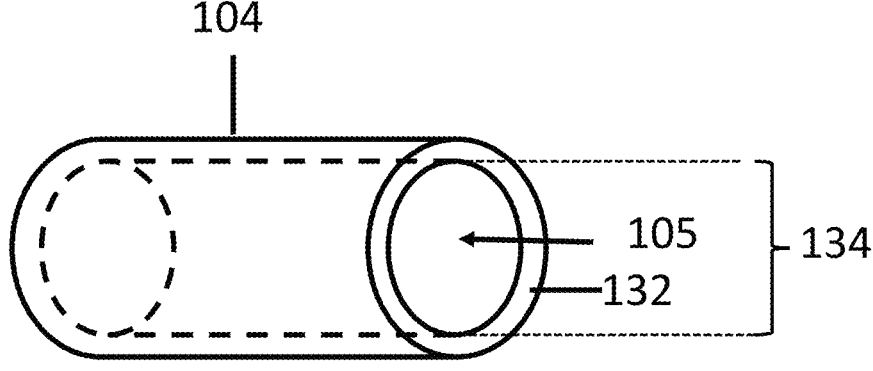
FIG. 1B shows a detail of the flow cell of FIG. 1A.

FIG. 1A is a diagram of a flow cell 100 and an optical spectrometer 102. FIG. 1B shows a detail of a waveguide 104. The flow cell 100 includes the waveguide 104 having a hollow core 105 defined through the waveguide 104 between a first end 106 and a second end 108. An inlet 110 is fluidly coupled at the first end 106 of the waveguide 104 and is configured to allow flow of a fluid 128 into or out of the hollow core 105 of the waveguide 104 at the inlet 110. An outlet 112 is fluidly coupled at the second end 108 of the waveguide 104 and is configured to allow flow of the fluid 128 into or out of the hollow core 105 of the waveguide 104 at the outlet 112. In some implementations, the first end 106 is inserted into an opening 107 to the inlet 110, and the second end 108 is inserted into an opening 109 to the outlet 112. The coupling at the first end 106 to the inlet 110, and the coupling at the second end 108 to the outlet 112 can include sealing elements such as ferrules, O-rings, compression fittings, and adhesives to ensure a fluid-tight coupling.

As used herein an "optical" spectrometer refers to spectrometers for analysis of electromagnetic radiation in the UV, Visible or Infrared spectrum. For example, the optical spectrometer can be for the analysis of Raman scattered light (a Raman Spectrometer), absorption of light (e.g., UV-Vis, FTIR), light emissions (e.g. fluorescence or phosphorescence), and polarization of light (e.g. circular dichroism). In some implementations, the spectrometer 102 is a Raman spectrometer.

A window 114 at the inlet 110 is optically coupled to the waveguide 104 at the first end 106. The window 114 is transparent to wavelengths of light emitted and received by the optical spectrometer 102. As used herein "transparent" to light means that the light entering and exiting the window is substantially unchanged. For example, for use of spectroscopies such as Raman, UV-Vis, FTIR, fluorescence or phosphorescence, the window 114 does not absorb the excitation light or the sample light. As another example, for use with polarization spectroscopies, the window does not change the polarization of the excitation light or the sample light. In some implementations, at least 95% of the light incident on the window 114 is transmitted through the window 114 without substantially changing.

In some implementations, the window 114 is transparent to light between about 100 nm and 1 mm. In some implementations the window 114 is transparent to light having wavelengths between about 100 nm and 400 nm (ultraviolet radiation), such as between about 100-280 nm, between about 280-315 nm, or between about 315-400 nm. In some implementations the window 114 is transparent to light having wavelengths between about 400 nm and 800 nm (visible radiation). In some implementations, the window 114 is transparent to light having wavelengths between about 800 nm and 1 mm (infrared radiation), such as between about 800 nm and 1400 nm, between about 1400 nm and 3 μm, or between about 3 μm and 1 mm. In some implementations, the widow 114 is transparent to light having wavelengths between about 500 nm and 1200 nm.

The window 114 is sealed against the fluid 128 leaking from an interior of the inlet 110 to an exterior of the inlet 110 at the window 114. The seal can be provided by any useful method, such as, an O-ring with a compression fitting, or a fluid-tight adhesive around a periphery of an opening 116 covered by the window 114. In some implementations, the window 114 is a substantially flat plate. In other implementations, the window 114 is a light pipe e.g. a non-hollow core waveguide such as an optical fiber (not shown) that is inserted and sealed into the opening 116. In some implementations, the window 114 is formed as part of a wall of the inlet 110, such that a part of the wall is transparent. The window 114 is optically coupled to the waveguide 104 at the first end 106. For example, a light beam 118 can enter or exit the inlet 110 through the window 114 and enter or exit the waveguide 104 at the first end 106. In some implementations, the light beam 118 can be a collimated beam. In some other implementations, the light beam 118 is focused at the first end 106, such as focused by a lens 120. In some implementations, the lens 120 is part of the flow cell 100.

Although no distinction is shown regarding an excitation light or sample light in the depiction of light beam 118, it is understood that the light beam 118 can include an excitation light emitted from the optical spectrometer 102 and a sample light that ultimately is directed to the spectrometer 102. For example, if the spectrometer 102 is a Raman spectrometer, the light beam 118 includes: a Raman laser beam travelling through the waveguide 104 in both direction (the excitation light): and incoherently scattered light (the sample light) produced by interaction of the Raman Laser beam with the fluid 128 and travelling in both directions through the waveguide 104. It is also understood that is adsorption spectroscopies, the sample light is the excitation light where some of the light energy is absorbed by the fluid 128.

A mirror 122 at the outlet 112 is optically coupled to the waveguide 104 at the second end 108. The mirror 122 is sealed against fluid leaking from an interior of the outlet 112 to an exterior of the outlet 112 at the mirror 122. The seal can be provided by any useful method. For example, an O-ring with a compression fitting or a fluid-tight adhesive around a periphery of an opening 124 covered by the mirror 122. In some implementations, the mirror 122 is a substantially flat mirror (i.e., not parabolic or curved). In other implementations, the mirror 122 is a parabolic or curved mirror. In some implementations, the mirror 122 is formed as part of a wall of the outlet 112, such that a part of the wall is reflective (e.g., it includes a reflective coating). In some implementations, multiple, or even all, internal walls of the outlet 112 are mirrors. The mirror 122 is optically coupled to the waveguide 104 at the second end 108. For example, a light beam 118 can enter first end 106, propagate through the waveguide 104, exit at second end 108, impinge on the mirror 122 where it is reflected back towards the second end 108 where it can enter the waveguide 104 and propagate back towards the first end 106 and the optical spectrometer 102. The mirror 122 doubles the path length for the light beam 118 through the waveguide 104, that is, the light beam 118 can interact with the fluid 128 as it travels in either direction through waveguide 104. In addition to the light beam 118, sample light (e.g., scattered, fluorescent or phosphorescent) travelling in waveguide 104 towards second end 108 is reflected by the mirror 122 and made to propagate back towards the first end 106. In some implementations, there is no window between the mirror 122 and the second end 108 so that light does not exit the outlet 112. This provides a very compact and effective arrangement where the mirror 122 acts both as a reflector and a sealed wall of the outlet 112.

A first conduit 126 is configured to couple the fluid 128 to the inlet 110 and a second conduit 130 is configured to couple the fluid to the outlet 112. The fluid 128 can be made to flow through the hollow core 105 (FIG. 1B) of the waveguide 104 from the first end 106 to the second end 108, or from the second end 108 to the first end 106. During a measurement, when the light beam 118 is directed through the hollow core 105 of the waveguide 104, the fluid 128 can be made to flow through the hollow core 105, or the fluid 128 can be stationary in the hollow core 105 and not flowing. In some implementations, the fluid 128 is sourced from a container such that at least one of the first conduit 126 and second conduit 130 are connected to the container. For example, the container containing the fluid 128 is coupled to the flow cell 100 so that the fluid 128 flows through the waveguide 104, and back to the container. In some implementations, fluid 128 is made to flow into the flow cell 100 and then flows out of the flow cell 100 into a waste stream rather than back to the container.

In some implementations, the first conduit 126 and the second conduit 130 are fluidly coupled to a pump. The pump can be positioned anywhere to cause flow through the flow cell 100. For example, a pump can be placed in line with the first conduit 126 or the second conduit 130. In some implementations, the pump is configured to cause a flow through the hollow core 105 of the waveguide 104 between the window 114 and the mirror 122. In some implementations, the pump causes the fluid 128 to flow from the first end 106 to the second end 108, or the pump causes the fluid 128 to flow from the second end 108 to the first end 106. The pump can also be implemented in a reactor connected to either the first conduit 128 or the second conduit 130, for example the pump can pressurize fluid 128 in the reactor to cause it to flow through the hollow core 105 of the waveguide 104. Any useful pump can be used, such as a positive displacement pump, a centrifugal pump, or a peristaltic pump.

In some implementations, the fluid 128 has an index of refraction $n_f$ that is larger than an index of refraction nm of a material 132 defining the hollow core 105 of the waveguide 104 (FIG. 1B). This relationship $(n_f > n_m)$ is required to provide total internal reflection of light, such as the beam 118, propagating through the waveguide 104. In some implementations, the index of refraction $n_f$ is between about 1.3 and 1.4, for example, water, having an index of refraction 1.33 can be included in the fluid 128 (e.g., an aqueous solution or suspension). In some implementations, the index of refraction nm of the material 132 is less than about 1.3. In some implementations, the index of refraction $n_m$ of the material 132 is 1.29 at 785 nm.

In some implementations, an inner diameter 134 of the hollow core 105 is larger than about 100 μm (FIG. 1B). In some implementations, the inner diameter 134 is between about 500 μm and 1000 μm. In some implementations, a length 136 (FIG. 1A) of the waveguide 104, between the first end 106 and the second end 108 is between about 15 and 25 cm. It is noted that although FIG. 1A depicts a straight waveguide 104, curved waveguides 104 are also contemplated and described in more detail below:

In some implementations, a filtering element is placed in-line with the fluid 128 flowing through the flow cell 100. For example the filtering element is placed in the first conduit 126, at an entrance to the first conduit 126, or upstream to the first conduit 126 if the fluid 128 is made to flow from the first end 106 to the second end 108. In another example, the filtering element is place in the second conduit 130, at an entrance to the second conduit 130, or upstream of the second conduit 130 if fluid is made to flow from the second end 108 to the first end 106. In some implementations, the filter is one or more of a ceramic filter, a glass fiber filer, a membrane filter, or a cellulose filter. In some implementations, the filtering element is rated to remove particles (e.g. colloidal particles, organisms) having diameters larger than the diameter 134 of the waveguide 104. In some implementations, the filtering element is rated to remove particles having diameters 90% of the diameter 134 of the waveguide (e.g., 80%, 50%, 20%, 10%).

In some implementations, the flow cell 100 is configured to reversibly couple to the optical spectrometer 102. For example, the coupling element 140 can be a reversible coupling element, such as a screw on coupling, a quick connect, a snap on coupling or the like. In some implementations, the flow cell 100 includes elements to adjust the relative position of the first end 106, window 114 and beam 118. These are not shown in FIG. 1A but can include small adjustment screws. Adjustment can be used to optimize the optical coupling of the light beam 118 to the first end 106.

Figure 2:
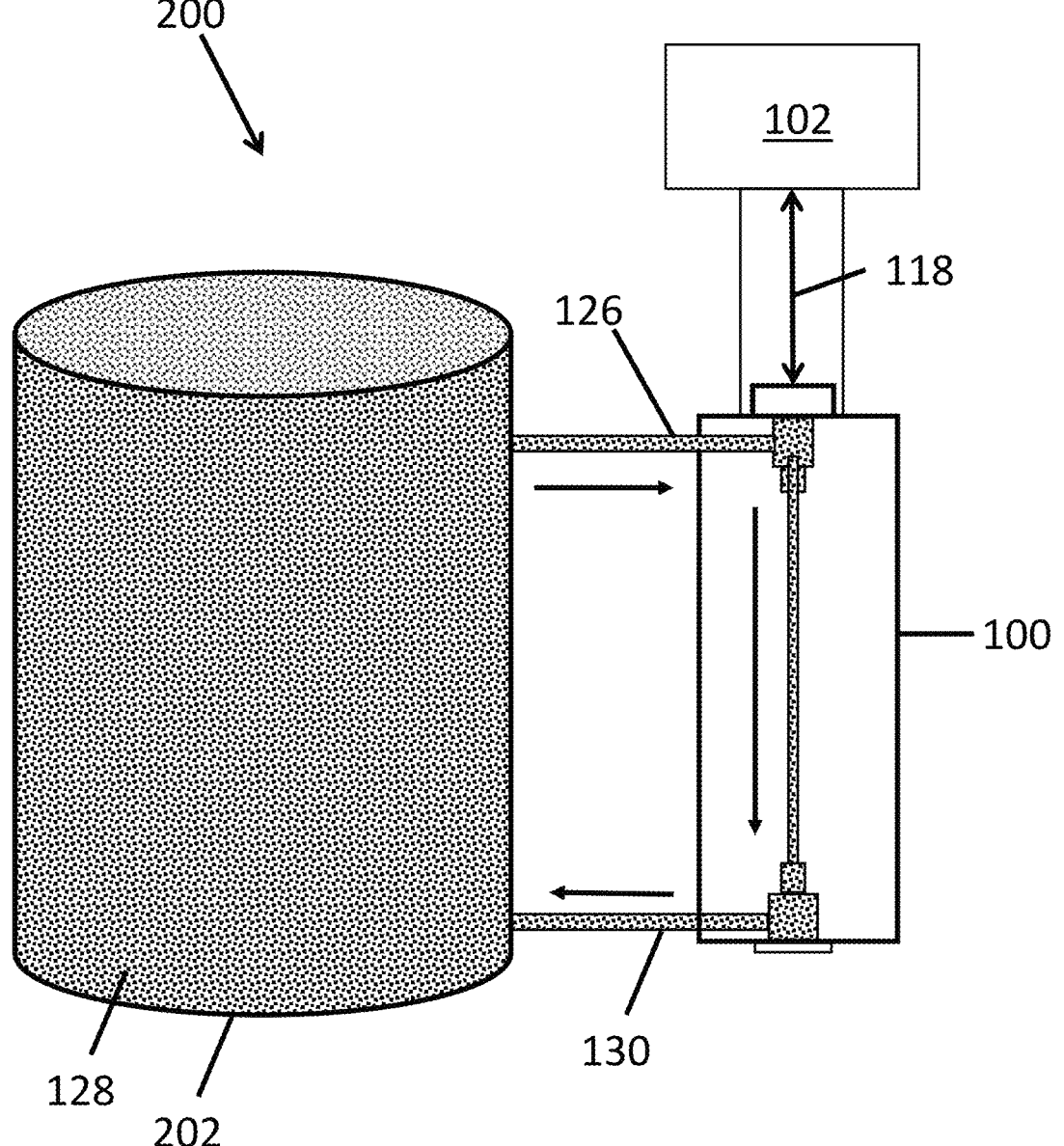
FIG. 2 is a schematic diagram of a system for in-line monitoring of a fluid process, according to some implementations.

FIG. 2 is a schematic diagram of a system 200 for in-line monitoring of a fluid process. The system includes the flow cell 100, optical spectrometer 102, and a reactor 202. The first conduit 126 is coupled to the reactor 202, and the second conduit 130 is also coupled to the reactor 202. The light beam 118 is depicted as a two headed arrow to denote excitation light coming from the optical spectrometer 102, and the excitation light reflected towards the optical spectrometer 102. The light propagating towards the optical spectrometer 102 can also include sample light from fluid 128 as previously described. Arrows 204 indicate a possible flow direction, although as previously described, a reverse flow or no flow can be used during a measurement with the Optical spectrometer 102.

The system can be used to monitor any reactor 202 containing a fluid 128. For example, in some implementations a colloid ripening process can be monitored. In another example, a chemical reaction is monitored. In some implementations, the reactor 202 is a bioreactor. For example, glucose, alcohol, acetone, amines, proteins, cell metabolites, cell media and feeds, or cell products are monitored.

Figure 3:
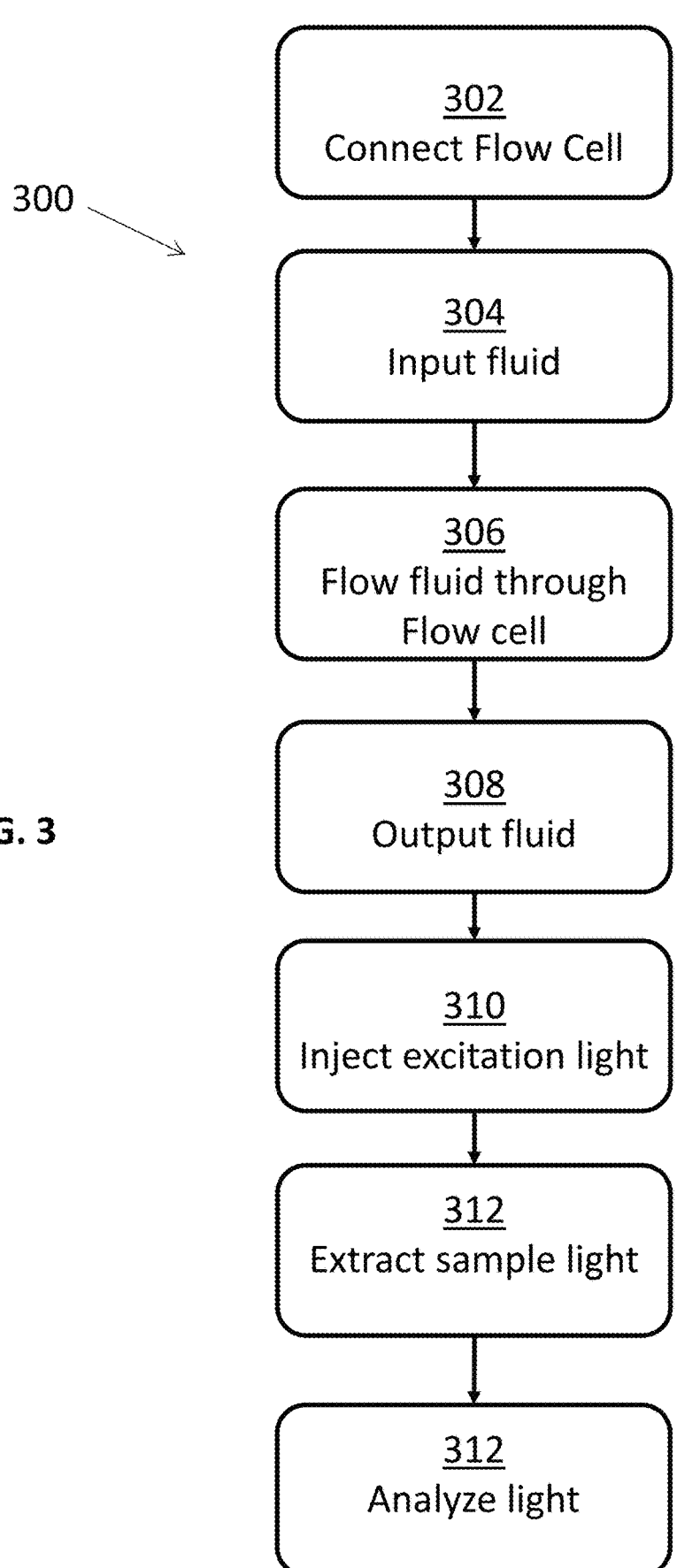
FIG. 3 is a flow diagram depicting a method of analyzing a liquid sample, according to some implementations.

FIG. 3 is a flow diagram depicting a method 300 of analyzing a liquid sample. A first step 302 includes connecting the optical spectrometer 102 to the flow cell 100. A second step 304 is to input the fluid 128 into the flow cell 100, for example through the first conduit 126, or through the second conduit 128. Step 306 includes flowing the fluid 128 through the flow cell 100, for example from the first end 106 to the second end 108, or from the second end 108 to the first end 106. The fluid 128 can be output through the second end 108, or the first end 106 depending on the flow direction. The fluid 128 is then output from the cell 100 in step 308. Steps 304, 306 and 308 prime the flow cell 100 with the fluid 128 so that fluid 128 fills the input 110, the waveguide 104 and the output 112. In some implementations, the fluid can be made to continuously flows through the flow cell 110 while, in step 310 excitation light beam, included in light beam 118, is injected into the flow cell 100 through the window 114. In some implementations, the fluid does not continuously flows through the flow cell 110 while excitation light beam is injected into the flow cell 100 through the window 114. The excitation light interacts with fluid 128 and sample light, included in light beam 118, is extracted through the window 114 in step 312. The sample light is provided to the optical spectrometer 102 for analysis of the fluid 128.

In some implementations, the fluid includes water. In some implementations, the fluid entering the flow cell 100 include only particles having a diameter smaller than about 100 μm. For example, the fluid 128 does not include particles larger than about 100 μm entering the flow cell 100. In some implementations, the fluid 128 includes biological cells. In some implementations, the first conduit 126 is fluidly connected to the reactor 202 which contains the fluid 128. Accordingly the method, in some implementations, includes connecting the conduit 126 to the reactor 202 and in-line monitoring the fluid 128 from the reactor 202.

EXEMPLIFICATIONS

Various implementations are contemplated for a hollow core waveguide flow cell for use with a portable optical spectrometer. Some possible implementations are described in this section.

Introduction

It has been long recognized that Raman spectroscopy is a powerful analytical tool for quantitative and qualitative analysis of chemicals. Part of the attraction of Raman spectroscopy is that it is highly amenable to analysis of aqueous samples since water is a weak Raman scatterer. Raman spectroscopy measurements can also be performed within a few seconds with no labor-intensive extractions or filtration procedures and are therefore highly amenable to real-time analysis. Raman spectroscopic measurements can quantify a wide variety of molecules simultaneously, so a single measurement can monitor various important small molecules such as sugars and amines, as well as large molecules such as proteins.

Integrated benchtop Raman systems have been developed for bioprocess monitoring. These benchtop systems usually utilize cooled light sensors and a spectrometer design with a large numerical aperture in order to reach high optical throughput and signal sensitivity, at the price of a bulky physical dimension. Generally, the limit of detection (LOD) of a benchtop integrated Raman for bioprocess monitoring has been reported to reach 0.5-2 mM.

Raman spectrometers can also be compact with no moving parts so that portable or handheld instruments can be placed, held, or mounted in convenient locations. Raman spectrometers are also highly modular and can be configured and modified with attachable accessories. Accordingly, handheld Raman spectrometers, rather than benchtop instruments, are favored for onsite analysis. However, the sensitivity of handheld Raman spectrometers is compromised compared to benchtop systems, due to the use of a non-cooled sensor and the compact size of the spectrometer which leads to a low numerical aperture. A cost-effective approach that improves the detection sensitivity will open many new opportunities for a handheld Raman spectrometer in the bio-pharmaceutical industry.

Current practices using a handheld Raman spectrometer for solution analysis is to contain the solution of interest in a cuvette which is then placed at the laser exit for Raman measurement. The limit of detection (LOD) has been characterized to reach ~1 g/L with 5 mins acquisition time by commercial handheld Raman analyzer. This LOD is insufficient as a process analytical tool for pharmaceutical manufacturing and bioprocessing where a LOD below 1 g/L is needed. For example, metabolic wastes such as ammonium can impact cell growth significantly at concentration of ~0.4 g/L. Currently the golden standard to characterize chemical components of bioreactor media is high-performance liquid chromatography (HPLC), with disadvantages including that it is time-consuming and labor intensive.

Improving the detection sensitivity of a handheld Raman analyzer for dissolved chemicals in solutions was recognized as a desirable goal. Raman scattering is an incoherent process linear to the optical power of excitation laser and the interaction length between the material and the excitation laser. For analysis of liquid samples, currently handheld Raman analyzers require users to contain the liquid of interest in a cuvette or vial, and the excitation laser interacts with the liquid within the container which is typically <10 mm long. Moreover, the collection of signals is limited to back-scattered Raman photons. In this design, the physical interaction length between the excitation laser with the liquid of interest is increased by >10 times and optimized for Raman measurement. In addition, this system is designed to collect both forward and backward-scattered Raman signals.

Design 1

Figures 4A, 4B:
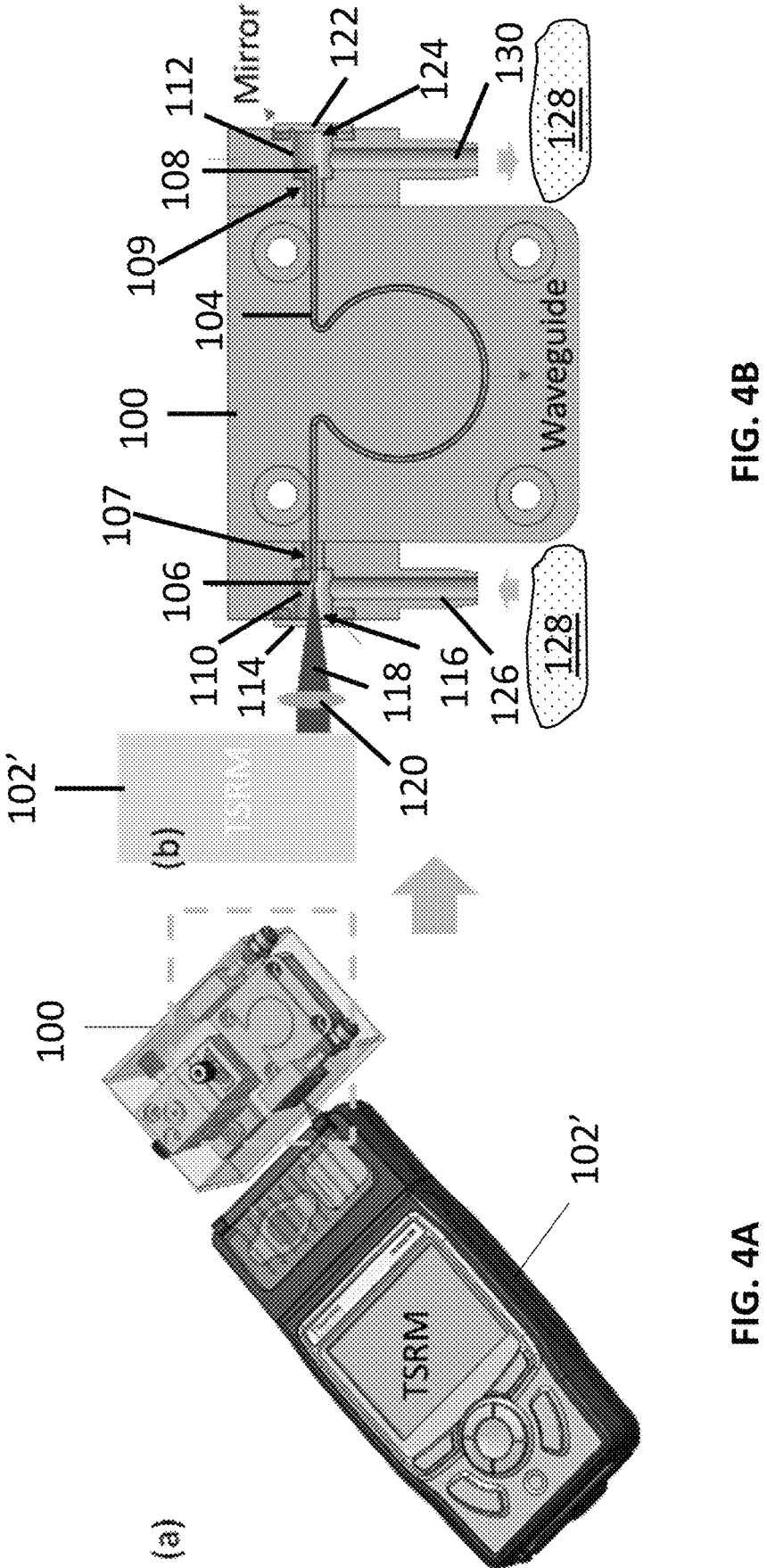
FIG. 4A shows a handheld Raman spectrometer coupled to a flow cell, according to some implementations.
FIG. 4B is a top view of the flow cell of 4A, showing some details.

FIG. 4A shows one possible configuration of such a device: a compact accessory to a handheld Raman spectrometer 102" (Thermo Fisher Scientific TRUSCAN™) for liquid analysis. FIG. 4B shows the design details of the accessory. Elements as described previously (FIG. 1A) are indicated. The laser output from the handheld Raman spectrometer 102' is focused into a waveguide 104 filled with target solutions. The refractive index of the waveguide 104 is selected to be lower than the solution, therefore total internal reflection can be achieved with the incident angle below the critical angle. Since the excitation laser is waveguided within the solution, the interaction length can be increased with low optical loss. The material of this waveguide 104 is Teflon AF2400 which exhibits a refractive index of 1.29 at 785 nm. The inlet 110 holds one end of the waveguide 104 for laser coupling, with the attached window 114 sealing the inlet 110 and transmitting the excitation laser into the waveguide 104. The outlet 112 holds the other end of the waveguide 104 with the attached mirror 122 that reflects the excitation laser and the forward-propagating Raman signals generated along the waveguide 104 back into the waveguide 104. This configuration allows high collection efficiency for both forward and backward propagating Raman signals.

Figure 5:
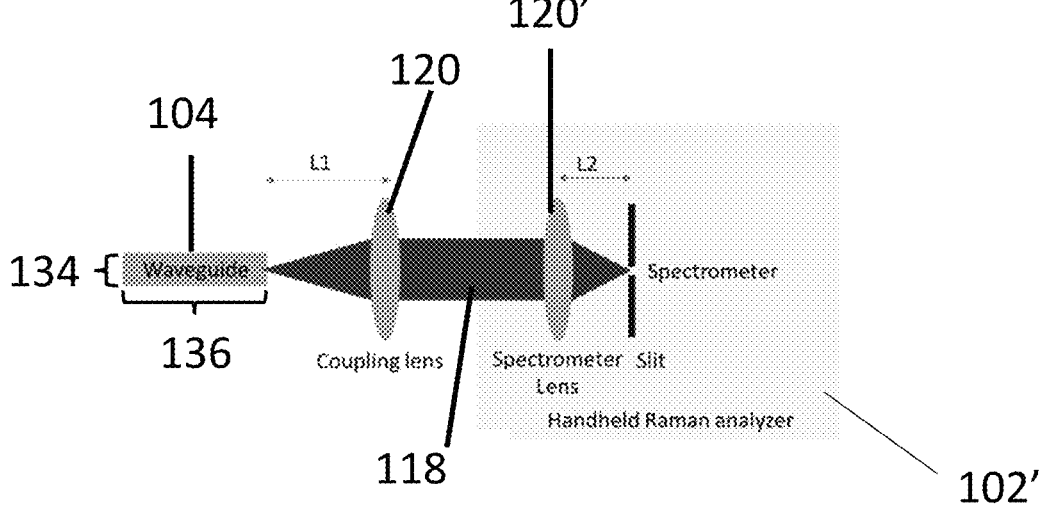
FIG. 5 is diagram showing some important parameters and relationships of coupling optics from a spectrometer to a waveguide, according to some implementations.

Important parameters in this configuration, depicted by FIG. 5, include the inner diameter 134 as well as the length 136 of the waveguide, and the focal length of the coupling lens 120 (L1), 120'(L2). Since the core of waveguide 104 is essentially imaged on the entrance slit of a typical spectrometer, with a magnification of L2/L1 determined by the focal lengths of the coupling lens (L2) and the lens before slit (L1), a larger inner diameter leads to lower light intensity through the entrance slit into the spectrometer. The trade-off between the inner diameter of waveguide and Raman signal level should be considered based on each application. For applications of monitoring liquid compositions in a bioreactor, an inner diameter of hundreds of micrometers can prevent clogging by cells with typical sizes of <100 μm. In the data presented here, 600 μm inner diameter is used to eliminate potential clogging issues by microbubbles or particulates. Considering the numerical aperture (NA) of 0.22 for this waveguide, and the clear aperture of 6 mm of the handheld Raman analyzer, a coupling lens with focal length of 25 mm is used.

Finally, the optimal length of the waveguide can be determined based on a model describing the Raman radiance inside a cylindrical waveguide core established by Altkorn et al. (Altkorn R, Malinsky M D, Van Duyne R P, Koev I. "Intensity Considerations in Liquid Core Optical Fiber Raman Spectroscopy". *Applied Spectroscopy*. 2001; 55(4): 373-381). In the reported model, the configuration of using a mirror at one end of the waveguide maximizes the Raman signals at the length of:

$$Zp = \frac{0.639}{\alpha};$$

where Zp is the optimum physical waveguide length, 1/α is the waveguide length at which the excitation laser intensity decreases to 1/e of its original value. 1/α is a function of the inner diameter of waveguide and the NA of the coupling lens. With a waveguide of 600 μm inner diameter and a coupling lens of 25 mm focal length, a 3% optical transmission of the 1-m long, water-filled waveguide is measured, which corresponds to ~19.8 cm optimum physical waveguide length. In comparison to other designs in which a long capillary waveguide without a mirror attached at one end enhances Raman signals, the configuration in this invention reduces the required waveguide length and thus the sampling volumes.

Design 1: Comparison Between Waveguide Raman and Normal Raman

A prototype based on Design 1 was built. The handheld Raman analyzer in the prototype is a Thermo Fisher Scientific TRUSCAN™, although the waveguided Raman accessory can be integrated with any handheld Raman analyzer to boost the detection limit for liquid samples. The following sections present the data acquired by waveguided Raman.

Figures 6A, 6B, 6C, 6D:
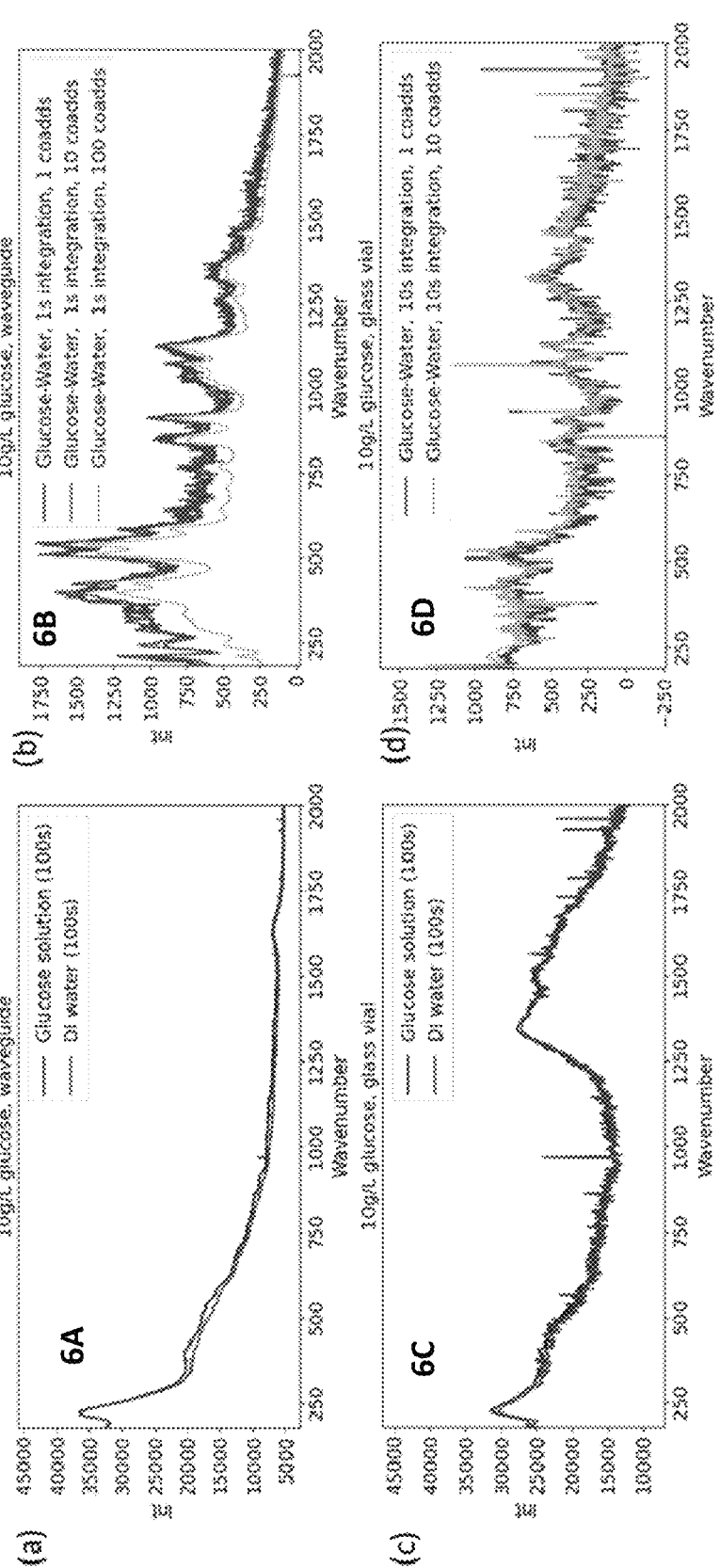
FIG. 6A is a raw spectra of glucose solution and DI water made by a Raman spectrometer coupled to a waveguide, according to some implementations.
FIG. 6B is a difference spectrum derived from the spectra of FIG. 6A.
FIG. 6D is a difference spectrum derived from the spectra of FIG. 6C.

The performance of this invention is evaluated by diluted glucose solutions. FIG. 6A shows the raw spectra of a 10 g/L glucose solution and deionized (DI) water acquired with the waveguided Raman accessory, and the difference between the 10 g/L glucose solution and DI water shown in FIG. 6B represents the Raman signature of glucose molecules. In comparison, FIG. 6C shows the raw spectra of the same glucose solution and DI water contained in glass vials, and the difference shown in FIG. 6D represents the Raman signature of glucose molecules. With 1 second integration time, the signature peak of glucose at 1124 cm$^{-1}$ acquired by the invented waveguided Raman (red in FIG. 6B) exhibits ~2 times higher signal-to-noise ratio (SNR) than the normal Raman that is acquired with total 100 seconds (orange in FIG. 6D). This demonstrates the waveguided Raman can improve the acquisition speed by >100 times without sacrificing the quality of Raman spectra.

Figures 7A, 7B:
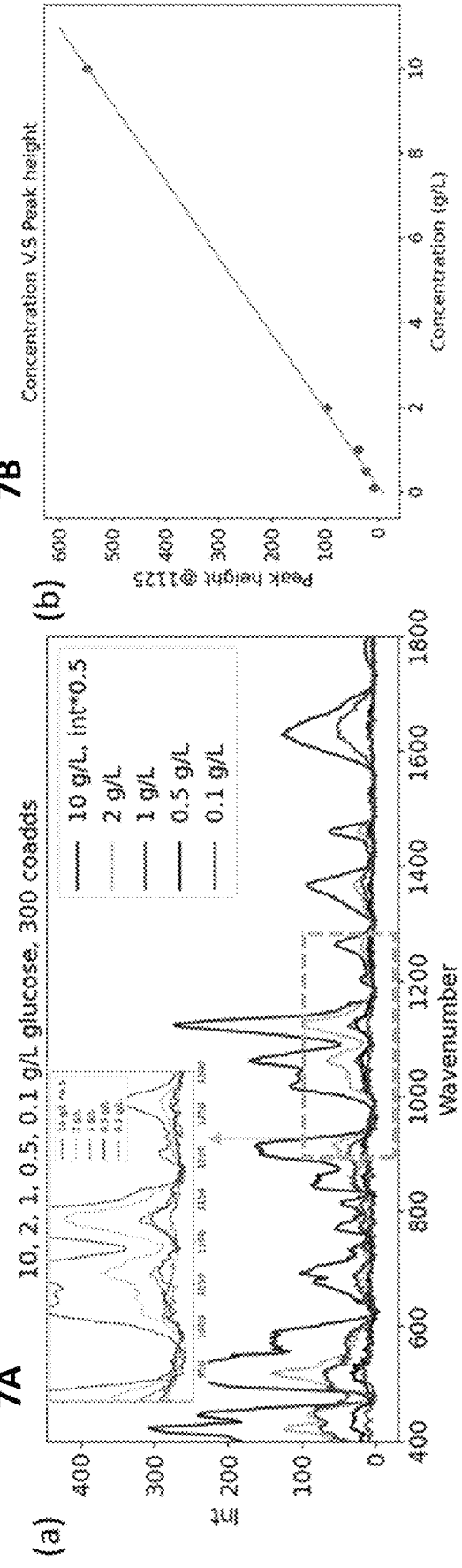
FIG. 7A is a Raman spectra of glucose solutions taken using a flow cell, according to some implementations.
FIG. 7B is a linearization plot of peak height to concentration at a signature peak of glucose that is shown in the spectra of FIG. 7A.

To evaluate the detection limit of the Design 1 waveguided Raman, Raman spectra of various diluted glucose solutions were collected with an acquisition time of 300 seconds. The dilutions plots with glucose concentrations at 10, 2, 1, 0.5 and 0.1 g/L is shown by FIG. 7A. The signature peak of glucose molecules at 1124 cm$^{-1}$ was observed even as low as at 0.1 g/L with a SNR of ~2. The peak heights at 1124 cm$^{-1}$ were generally linear to the concentration as shown by FIG. 7B. This data suggests a limit of detection down to ~0.1 g/L with 300 seconds acquisition time.

Design 2

Figure 8:
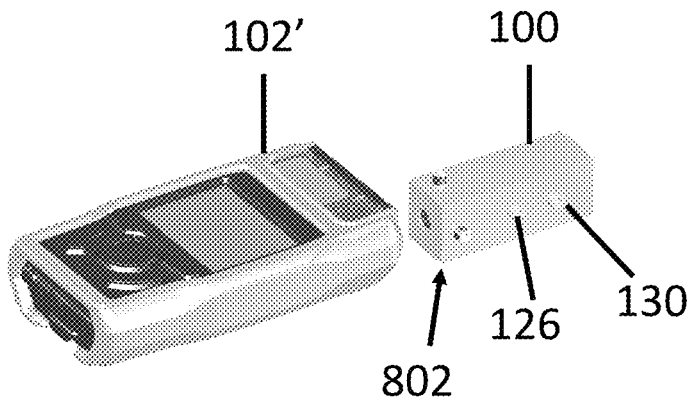
FIG. 8 shows a handheld Raman spectrometer coupled to a flow cell, according to some other implementations.

FIG. 8 shows another possible configuration of the flow cell 100 used with the Thermo Fisher Scientific TRSCAN™ handheld Raman spectrometer 102' for liquid analysis. The first conduit 126 and the second conduit 130 are indicated and can serve as the external couplings to a liquid sample. An adjustable lens mount 802 is also indicated. The adjustable lens mount 802 houses the lens 120, rather than the spectrometer 102. Such and adjustable lens mount 802 can be used with any of the flow cells 100 described herein.

Figures 9A, 9B:
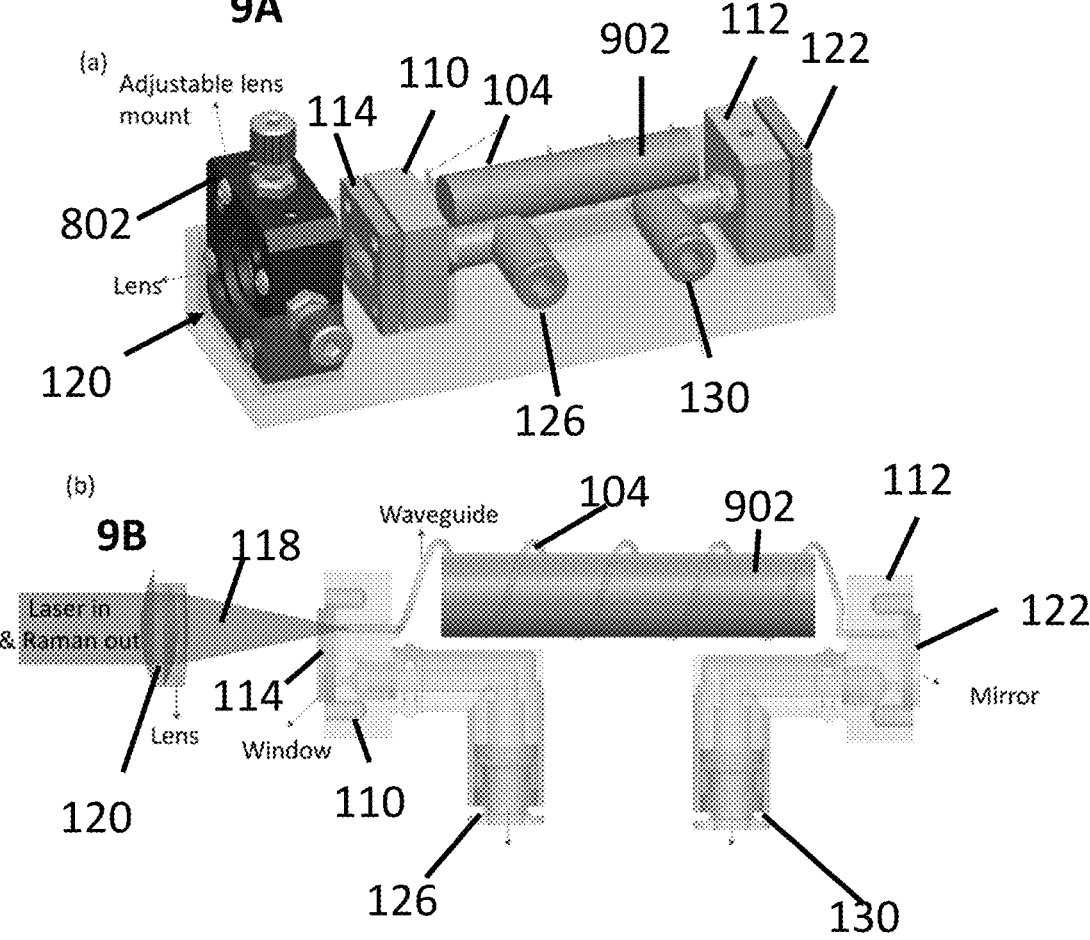
FIG. 9A shows the components inside the flow of FIG. 8.
FIG. 9B is the top view of the flow cell.

FIG. 9A shows the components inside the flow cell 100, and FIG. 9B is the top view of the flow cell 100. The laser output light beam 118 from the handheld Raman spectrometer 102 is focused by lens 120 into the waveguide 104 filled with target solutions. The lens 120 can be adjusted by the adjustable lens mount 802. In this design, the waveguide 104 is wrapped around a core 902 that helps support and organize the waveguide 104. The core 902 helps provide a compact design. As with Design 1, the refractive index of the waveguide 104 can be selected to be lower than water (1.33), and therefore total internal reflection can be achieved with the incident angle below the critical angle. Since the excitation laser is waveguided within the solution, the interaction length can be increased with low optical loss. The material of the waveguide 104 can also be Teflon AF2400 which exhibits a refractive index of 1.29 at 785 nm. One end of the waveguide 104 is held by the inlet 110 for laser coupling, with the attached window 114 sealing the inlet 110 and transmitting the excitation laser into the waveguide 104. The outlet 112 holds the other end of the waveguide 104 with the attached mirror 122 that reflects the excitation laser and the forward-propagating Raman signals generated along the waveguide 104. The generated Raman signals exit the waveguide 104 and then return to the handheld Raman spectrometer 102. As in Design 1, the Design 2 configuration allows high collection efficiency for both forward and backward propagating Raman signals, and at the same time reduce the sampling volume required for this flow cell. As with Design 1, the Design 2 waveguided Raman flow cell can work with any other Raman instrument.

The following numbered paragraphs 1-21 provide various examples of the embodiments disclosed herein.

Paragraph 1. A flow cell (100) comprising: a waveguide (104) having a hollow core (105): an inlet (110) fluidly coupled at a first end (106) of the hollow core (105): an outlet (112) fluidly coupled at a second end (108) of the hollow core (105): a window (114) at the inlet (110) optically coupled to the waveguide (104) at the first end (106): a mirror (122) at outlet (112) optically coupled to the waveguide (104) at the second end (108): a first conduit (126) configured to couple a fluid (128) to the inlet (110); and a second conduit (130) configured to couple the fluid (128) to the outlet (112).

Paragraph 2. The flow cell (100) according to paragraph 1, wherein first conduit (126) and the second conduit (130) are fluidly coupled to a pump.

Paragraph 3. The flow cell (100) according to paragraph 2, wherein the pump is configured to cause a flow through the hollow core (105) between the window (114) and the mirror (122).

Paragraph 4. The flow cell (100) according to paragraph 3, wherein the flow is from the first end (106) to the second end (108), or from the second end (108) to the first end (106).

Paragraph 5. The flow cell (100) according to any of paragraphs 1-4, wherein an index of refraction nf of the fluid (128) is larger than an index of refraction nm of a material (132) defining the hollow core (105) of the waveguide (104).

Paragraph 6. The flow cell (100) according to paragraph 5, wherein the index of refraction of the fluid nf is between about 1.3 and 1.4.

Paragraph 7. The flow cell (100) according to paragraph 5 or paragraph 6, wherein the index of refraction $n_m$ of the material (132) is about 1.29 at 785 nm.

Paragraph 8. The flow cell (100) according to any of paragraphs 1-7, wherein an inner diameter (134) of the hollow core (105) is larger than about 100 μm.

Paragraph 9. The flow cell (100) according to paragraph 8, wherein the inner diameter (134) is between about 500 μm and 1000 μm.

Paragraph 10. The flow cell according to any of paragraphs 1-9 wherein a length of the waveguide 104 is between about 15 and 25 cm.

Paragraph 11. The flow cell (100) according to any of paragraphs 1-10, wherein the flow cell (100) is configured to reversibly couple to an optical spectrometer (102).

Paragraph 12. The flow cell (100) wherein the flow cell (100) is configured to reversibly couple to a Raman spectrometer.

Paragraph 13. The flow cell (100) according to any of paragraphs 1-12 further including a lens (120) configured to focus a light beam (118) at the first end 106 of the waveguide (104).

Paragraph 14. A system for in-line monitoring of a fluid process, comprising: a waveguide having a hollow core defined between a first end and a second end of the waveguide: a window optically coupled at the first end and configured to transmit light into and out of the hollow core: a mirror optically coupled at the second end of the waveguide and configured to reflect light towards the first end: an inlet fluidly coupled at the first end to the hollow core and an outlet fluidly coupled at the second end to the hollow core: a first conduit fluidly coupling a reactor to the inlet: a second conduit fluidly coupling the outlet to the reactor: and an Optical spectrometer optically coupled to the waveguide.

Paragraph 15. The system according to paragraph 14, wherein the reactor is a bioreactor.

Paragraph 16. A method of analyzing a liquid sample comprising: connecting an optical spectrometer to the flow cell according to any of paragraphs 1-13: flowing the fluid through the flow cell: injecting an excitation light into the flow cell through the window: extracting sample light from the flow cell through the window; and providing the scattered Raman light to the spectrometer for analysis of the fluid sample.

Paragraph 17. The method according to paragraph 16, wherein the fluid flows through the waveguide from the first end to the second end, or the fluid flows through the waveguide from the second end to the first end.

Paragraph 18. The method according to paragraph 16 or paragraph 17, wherein the fluid includes water.

Paragraph 19. The method according to any of paragraphs 16-18, wherein the fluid includes particles smaller than about 100 μm.

Paragraph 20. The method according to any of paragraphs 16-19, wherein the fluid includes biological cells.

Paragraph 21. The method according to any of paragraphs 16-20, wherein the first conduit is fluidly connected to a reactor.

Paragraph 22. The method according to any of paragraphs 16-21, wherein the optical spectrometer is a Raman spectrometer.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above implementation and examples but is encompassed by the following claims. All publications and patent applications cited above are incorporated by reference in their entirety for all purposes to the same extent as if each individual publication or patent application were specifically and individually indicated to be so incorporated by reference.

What is claimed is:

1. A flow cell comprising:
a waveguide having a hollow core;
an inlet fluidly coupled at a first end of the hollow core;
an outlet fluidly coupled at a second end of the hollow core;
a window at the inlet optically coupled to the waveguide at the first end;
a mirror at the outlet optically coupled to the waveguide at the second end;
a first conduit configured to couple a fluid to the inlet; and
a second conduit configured to couple the fluid to the outlet.

2. The flow cell according to claim 1, wherein the first conduit and the second conduit are fluidly coupled to a pump.

3. The flow cell according to claim 2, wherein the pump is configured to cause a flow through the hollow core between the window and the mirror.

4. The flow cell according to claim 3, wherein the flow is from the first end to the second end, or from the second end to the first end.

5. The flow cell according to claim 1, wherein an index of refraction $n_f$ of the fluid is larger than an index of refraction $n_m$ of a material defining the hollow core of the waveguide.

6. The flow cell according to claim 5, wherein the index of refraction $n_f$ of the fluid is between 1.3 and 1.4.

7. The flow cell according to claim 5, wherein the index of refraction $n_m$ of the material is 1.29 at 785 nm.

8. The flow cell-according to claim 1, wherein an inner diameter of the hollow core is larger than 100 μm.

9. The flow cell according to claim 8, wherein the inner diameter is between 500 μm and 1000 μm.

10. The flow cell according to claim 1 wherein a length of the waveguide is between 15 and 25 cm.

11. The flow cell according to claim 1, wherein the flow cell is configured to reversibly couple to a spectrometer.

12. The flow cell according to claim 1, wherein the flow cell is configured to reversibly couple to a Raman spectrometer.

13. The flow cell according to claim 1 further including a lens configured to focus a light beam at the first end 106 of the waveguide.

14. A method of analyzing a liquid sample comprising:
    connecting an optical spectrometer to the flow cell according to claim 1;
    flowing the fluid through the flow cell;
    injecting an excitation light into the flow cell through the window;
    extracting sample light from the flow cell through the window; and providing the sample light to the spectrometer for analysis of the fluid sample.

15. The method according to claim 14, wherein the fluid flows through the waveguide from the first end to the second end, or the fluid flows through the waveguide from the second end to the first end.

16. The method according to claim 14, wherein the fluid includes water.

17. The method according to claim 14, wherein the fluid includes particles smaller than 100 μm.

18. The method according to claim 14, wherein the fluid includes biological cells.

19. The method according to claim 14, wherein the first conduit is fluidly connected to a reactor.

20. The method according to claim 14, wherein the optical spectrometer is a Raman spectrometer.

21. A system for in-line monitoring of a fluid process, comprising:
    a waveguide having a hollow core defined between a first end and a second end of the waveguide;
    a window optically coupled at the first end and configured to transmit light into and out of the hollow core;
    a mirror optically coupled at the second end of the waveguide and configured to reflect light towards the first end;
    an inlet fluidly coupled at the first end to the hollow core and an outlet fluidly coupled at the second end to the hollow core;
    a first conduit fluidly coupling a reactor to the inlet;
    a second conduit fluidly coupling the outlet to the reactor; and
    a spectrometer optically coupled to the waveguide.

22. The system according to claim 21, wherein the reactor is a bioreactor.

* * * * *